United States Patent [19]
Aoyama

[11] 3,909,405
[45] Sept. 30, 1975

[54] METHOD FOR TREATING ALKALINE WASTE STREAMS CONTAINING ALUMINUM DISSOLVED THEREIN

[75] Inventor: Yoshio Aoyama, Kyoto, Japan

[73] Assignee: Dai-Doh Plant Engineering Corporation, Osaka, Japan

[22] Filed: Apr. 4, 1973

[21] Appl. No.: 347,767

[30] Foreign Application Priority Data
Apr. 7, 1972 Japan.............................. 47-35346
July 29, 1972 Japan.............................. 47-76363

[52] U.S. Cl. ................... 210/46; 210/47; 210/51
[51] Int. Cl.² ..................... C02B 1/20; C02C 5/02
[58] Field of Search .................... 210/42, 45–47, 210/51; 423/122, 127; 23/301 R, 305

[56] References Cited
UNITED STATES PATENTS

| | | | |
|---|---|---|---|
| 2,247,624 | 7/1941 | Wall | 23/305 |
| 3,466,142 | 9/1969 | Hambly | 23/305 |
| 3,494,864 | 2/1970 | Willihnganz | 210/45 |
| 3,539,468 | 11/1970 | Wright | 423/127 X |
| 3,545,923 | 12/1970 | Mercier et al. | 423/127 |

*Primary Examiner*—Thomas G. Wyse
*Attorney, Agent, or Firm*—Sughrue, Rothwell, Mion, Zinn & Macpeak

[57] ABSTRACT

A method for treating an acidic or alkaline waste liquid containing aluminum dissolved therein to convert it to a neutral liquid free from colloidal aluminum hydroxide, wherein the aluminum present in the hydrolysis system is hydrolyzed in the presence of 1 to 5 Kg, per kilogram of aluminum, of crystalline aluminum oxide having an average particle diameter of about 0.5 to about 500 $\mu$.

15 Claims, 2 Drawing Figures

METHOD FOR TREATING ALKALINE WASTE STREAMS CONTAINING ALUMINUM DISSOLVED THEREIN

BACKGROUND OF THE INVENTION

1. Field of the Invention

This invention relates to a novel method for treating an alkaline waste stream containing aluminum by hydrolyzing the aluminum to precipitate it as noncolloidal hydrous aluminum oxide, and specifically to a method for treating a solution containing aluminum to precipitate the aluminum as hydrous aluminum oxide which is easy to settle and which has a low water content.

2. Description of the Prior Art

It is well known that when acidic or alkaline liquid industrial waste which contains aluminum dissolved therein is hydrolyzed by neutralization white colloidal aluminum hydroxide is formed. The conventional practices to separate the colloidal aluminum hydroxide from the liquid involve allowing the colloid-containing liquid to stand in a large volume of a thickener, or blowing air into the colloid-containing liquid to float the colloid. However, since the separability of colloidal aluminum hydroxide from the liquid is poor, these conventional methods require long periods of time for the separation, and even with a long time the colloidal aluminum hydroxide cannot be completely separated, that is, the liquid still contains a considerable amount of the colloid that is left unseparated. The discharging of such a liquid into rivers constitutes one cause of river pollution and contamination.

On the other hand, the separated aluminum hydroxide still contains a large quantity of water, and a large amount of energy is required to dry it. Accordingly, without being effectively utilized by industry, the separated aluminum hydroxide is discarded in woods or rivers and becomes another source of public hazards.

SUMMARY OF THE INVENTION

A primary object of this invention is to provide a novel method for treating an alkaline waste stream containing aluminum whereby the aluminum in the alkaline waste stream can be separated in the form of hydrous aluminum oxide which is easy to settle and which has a low water content.

Another object of this invention is to provide a method for treating an alkaline waste liquid containing aluminum dissolved therein to convert it to a neutral liquid free from colloidal aluminum hydroxide.

In detail, the present invention provides a method for treating an alkaline waste stream containing aluminum, which comprises hydrolyzing the aluminum present in this hydrolysis system in the presence of 1 to 5 Kg, per kilogram of the aluminum, of crystalline aluminum oxide having an average particle diameter of about 0.5 to about 500 $\mu$.

DETAILED DESCRIPTION OF THE INVENTION

Figure 1:
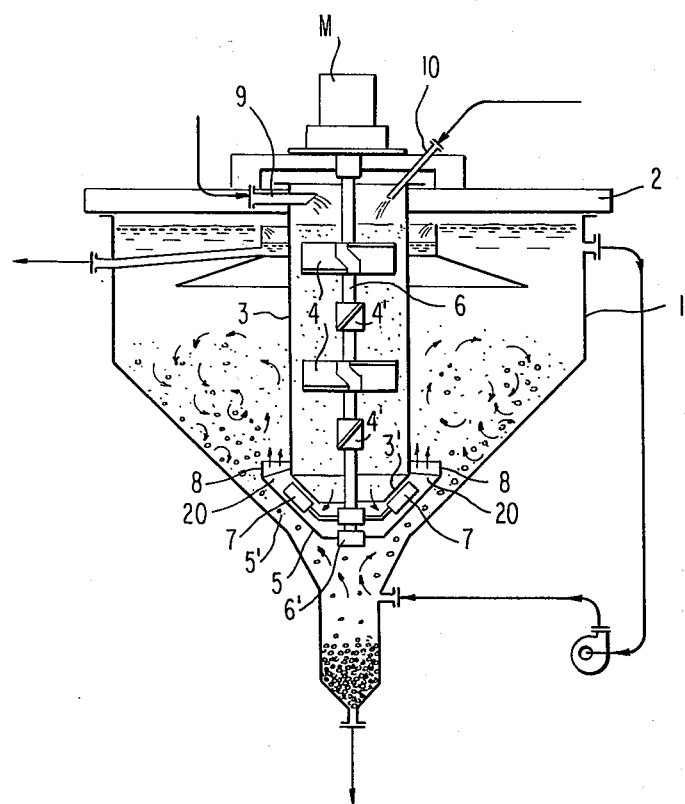
FIG. 1 is a transverse sectional view of a pelletizer for increasing the particle diameter of hydrous aluminum hydroxide particles precipitated by the method of this invention.

According to the present invention, a solution containing aluminum dissolved therein is hydrolyzed by the method to be described in the presence of crystalline aluminum oxide granules. As a result, the aluminum in the solution is converted to noncolloidal hydrous aluminum oxide by the action of the surface of the crystalline aluminum oxide and deposits onto the surface of the crystalline aluminum oxide. The hydrous aluminum oxide containing crystalline aluminum oxide is very easy to precipitate and has a low water content.

Examples of the crystalline aluminum oxides are crystalline aluminas such as $\alpha$-alumina, $\gamma$-alumina, $\theta$-alumina, -alumina, $\chi$-alumina, and crystalline hydrate aluminas such as boehmite ($Al_2O_3 \cdot \frac{1}{2}H_2O$), and ortho aluminum hydroxides which include bayerite ($Al_2O_3 \cdot 3H_2O$) and gibbsite ($Al_2O_3 \cdot 3H_2O$).

The present invention can be applied to all systems in which, if the hydrolysis reaction is conducted by means of neutralization, etc., without the presence of crystalline alumina, colloidal hydrous aluminum is yielded. That is, the phenomena where aluminum in solution is precipitated in a colloidal state means that the above described aluminum can be hydrolyzed. If the hydrolysis reaction can be conducted, the precipitated alumina can be made non-colloidal according to the present invention, i.e., by the coexistence of crystalline aluminum oxide. Consequently, according to the present invention, no untreatable aluminum compound exists so far as it can be hydrolyzed.

On the other hand, of course, if any certain aluminum compound could not be hydrolyzed even by neutralization, etc., and accordingly colloidal hydrous aluminum could not be formed, the present invention would not essentially relate to the above case, but no such compounds have yet been found by the present inventors. Since aluminum per se is amphoteric, aluminum compounds can generally be dissolved in almost any acid or almost any base and the resulting solution can be used in the present invention.

Examples of the wide variety of aluminum solution treated by the method of this invention are:

1. Solutions of aluminum or aluminum compounds in an acidic liquid. Examples of the aluminum compounds include hydroxy aluminates such as $Na[Al(OH)_4]$, $Ca[Al(OH)_5]$, $Ba[Al(OH)_4]$, $Sr_3[Al(OH)_6]_2$, or $Mg[Al(OH)_5]$, aluminum hydroxides such as $Al_2O_3 \cdot 3H_2O$, $Al_2O_3 \cdot nH_2O$, or $AlO(OH)$, aluminum sulfates such as $Al_2(SO_4)_3$, $KAl(SO_4)_2$, $NH_4Al(SO_4)_2$, $NaAl(SO_4)_2$, $TlAl(SO_4)_2$, $LiAl(SO_4)_2$, $CsAl(SO_4)_2$, or $RbAl(SO_4)_2$, aluminum oxide-acid addition compounds such as $(Al_2O_3H)_2SO_4$, $(Al_2O_3H)H_2PO_4$, $(Al_2O_3H)_2HPO_4$, $(Al_2O_3H)Cl$, or $(Al_2O_3H)_2SiO_3$, aluminum arsenates such as $Al(H_2AsO_4)_3$, aluminum halides such as $AlF_3$, $AlF_3 \cdot 2KF$, $AlCl_3$, $AlBr_3$ or $AlI_3$, double salts of $AlCl_3$ and organic compounds such as $AlCl \cdot (C_6H_5)_2CO$, $AlCl_3 \cdot C_6H_5COCl$, $AlCl_3 \cdot o\text{-}C_6H_4BrNO_2$, $AlCl_3 \cdot m\text{-}(C_6H_4BrNO_2)$, $AlCl_3 \cdot p\text{-}C_6H_4BrNO_2$, $AlCl_3 \cdot o\text{-}C_6H_4ClNO_2$, $AlCl_3 \cdot m\text{-}C_6H_4ClNO_2$ or $AlCl_3 \cdot p\text{-}C_6H_4ClNO_2$, double salts of $AlBr_3$ and an organic compound such as $AlBr_3 \cdot C_6H_6$, $AlBr_3 \cdot (C_6H_5)CO$, $AlBr_3 \cdot C_6H_5COCl$, $AlBr_3 \cdot C_6H_5NO_2$ or $AlBr_3(CH_3)_2O$, other soluble inorganic aluminum compounds such as $AlP$, $Al(NO_3)_3$, $Al(SeO_4)_3$, $Al(ClO_4)_3$ or $AlNa_3F_6$, other organic aluminum compounds such as $Al(C_2H_3O_2)_3$, $Al(C_3H_6NO)_3$, or $Al(C_{10}H_{15}OSO_4)_2$ and the like. The acidic liquids may be any acidic liquid which can dissolve aluminum or the aluminum compounds. Examples of such an acidic liquid are mineral acids such as hydrochloric acid, sulfuric acid, sulfamic acid, nitric acid, phosphoric acid, pyrophosphoric acid, chromic acid, acid sodium phosphate, boric acid or phosphomolybdic acid, monocarboxylic acids such as formic acid, acetic acid, propionic acid, butyric acid or benzoic acid, di- to polycarboxylic acids such as oxalic acid, malonic acid, succinic acid, adipic acid, maleic acid, itaconic acid, phthalic acid, citric acid or glucolic acid, amino acids such as glutamic acid, glycine or tryptophan, or phenols such as phenol; and their mixtures or their aqueous solutions. As the above acidic liquid, there can also be used aqueous solutions of conjugate acid salts which can dissolve in water to give an acidic aqueous solution, examples of which are $MgSO_4$, $MgCl_2$, $CaSO_4$, $FeSO_4$, $Fe_2(SO_4)_3$, $(NH_4)H_2PO_4$, $NaH_2PO_4$, $Al(CH_3COO)_3$, $NaHSO_3$, $(NH_4)_2SO_4$, $(NH_4)HSO_4$, $NaHPO_4$, $NaH(PHO_3)$, $NH_4ClO_4$, $NaClO_3$, $Al_2(SO_4)_3$, $KAl(SO_4)_2$, $(NH_4)Al(SO_4)_2$, $Na_2S_2O_5$ and $K_2S_2O_5$.

2. Solutions of aluminum or aluminum compounds in an alkaline liquid. The aluminum compounds include those abovementioned for solutions in an acidic liquid. The alkaline liquid may be any alkaline liquid which can dissolve aluminum or aluminum compounds. Examples of the alkaline liquids are aqueous solutions of inorganic hydroxides such as lithium hydroxide, sodium hydroxide, potassium hydroxide, rubidium hydroxide, cesium hydroxide, calcium hydroxide, barium hydroxide, thorium hydroxide, or ammonium hydroxide, and aqueous solutions of conjugate base salts which can dissolve in water to give an alkaline aqueous solution, examples of which are $Na_2CO_3$, $NaHCO_3$, $CaCO_3$, $K_2CO_3$, $NaSH$, $Na_2S$, $C_6H_5(NH_2)(COCH_3)$, $CH_3)_2C(NH_2)CH_2COOH$, $H_2NCH_2CH_2SH$, or $C_9H_6N(NH_2)$.

3. Aqueous solutions of water-soluble aluminum compounds. Examples of the water-soluble aluminum compounds are the above-illustrated aluminum sulfates, hydroxy aluminates, aluminum oxideacid addition compounds, aluminum arsenates, aluminum halides, double salts of an organic compound and $AlCl_3$, and inorganic aluminum compounds such as $AlP$, $Al(NO_3)_3$, $Al(SeO_4)_3$, $Al(ClO_4)_3$ or $AlNa_3F_6$. An aqueous solution of such water-soluble salts is not neutral but is acidic or basic. In general, an aqueous solution of a salt of a strong acid and a weak base is acidic, while, on the other hand, that of a salt of a weak acid and a strong base is basic. Generally, in an aluminum compound, the acidic state is not balanced with the basic state, so the compound shows either an acidic or basic state.

Especially good results can be obtained when the method of this invention is applied to the treatment of aqueous solutions of sulfuric acid, hydrochloric acid, nitric acid, phosphoric acid, oxalic acid or sodium hydroxide having aluminum or aluminum compounds dissolved therein.

The above-illustrated aluminum-containing solutions may include undissolved aluminum or aluminum compounds, and may further contain a water-soluble organic compound dissolved therein. Examples of the organic compounds are mono- or polyhydric alcohols such as methyl alcohol, ethyl alcohol, ethylene glycol, or glycerol, aldehydes such as formaldehyde or acetaldehyde, ketones such as acetone or methyl ethyl ketone, ketone alcohols such as acetol, carboxylic acid esters such as ethyl acetate or methyl glycolate, and chelating agents such as gluconic acid salts, citric acid salts, tetraphosphoric acid salts or ethylenediaminetetraacetic acid (EDTA).

Basically speaking, there is no limitation on the amount of aluminum or aluminum compound present during treatment since such materials easily assume a supersaturated state, and such is often the case in the present invention. For most commercial operations, however, the preferred concentration of aluminum is as follows: (in the case of an aluminum compound, a calculated value based on aluminum is used in the present invention);

0.01% (absolute concentration) - 100% (supersaturated concentration)

(In the above case, if the saturated concentration of aluminum able to dissolve in a solution is defined as "X g/l", a degree of the supersaturated concentration is given by the following equation $X/Y - X \times 100$; wherein Y represents the concentration of aluminum at supersaturation.)

If less than 0.01% aluminum is present, the condensibility of the precipitated particles according to the present treatment becomes worsened, and consequently, the separation tends to be worsen a little. On the other hand, with a more than 100% supersaturated concentration, the hydrolysis reaction is accelerated and the precipitated particles tend to be slightly colloidal. For these reasons, the preferred concentration thereof is from 0.1 wt% to a saturated concentration thereof.

In the present invention, one method of hydrolyzing aluminum in the solution is a neutralization treatment. Since the aluminum-containing solution to be treated is generally acidic or alkaline, it can be neutralized using an alkali for an acidic solution and an acid for an alkaline solution. The acid or alkali that can be used in this treatment may be in the broad range of acids or alkalies capable of rendering the pH of the solution near 7. Examples of such acids are the above illustrated mineral acids, carboxylic acids, amino acids, phenols, or aqueous solutions of any of these, or aqueous solutions of the above illustrated conjugate acid salts. Examples of the alkalies are aqueous solutions of the above illustrated inorganic hydroxides or conjugate base salts. These acids or alkalies may contain aluminum dissolved therein. In the case of the neutralization of an acidic aluminum-containing solution by an alkali and the neutralization of an alkali aluminumcontaining solution by an acid in accordance with the present invention, it is recommended to employ a method wherein the acidic aluminum-containing solution and the alkaline aluminumcontaining solution are neutralized by each other. Preferably, an aqueous solution of an inorganic hydroxide, especially sodium hydroxide, containing aluminum dissolved therein and an aqueous solution of a mineral acid, especially sulfuric acid, hydrochloric acid, nitric acid, phosphoric acid or oxalic acid, containing aluminum dissolved therein are neutralized with each other.

In the present invention, the neutralization treatment as one of the hydrolysis treatments means that the pH of the neutralized solution reaches 7.0, but the pH of the neutralized solution after neutralizing need not necessarily be at 7.0. However, if the neutralized solution is treated with a strong acid of less than pH 3.0, it is necessary to make the pH of the resulting solution more than 3.0, preferably more than 3.5. This is because if the pH of the resulting solution is less than 3.0, the hydrolysis of aluminum is a solution does not proceed. From the stand point of public pollution, the pH of the neutralized solution should reach 7.0 in so far as is possible.

When an ordinary alkaline aluminum-containing solution is rapidly cooled, for example, at a rate of about 5°C/hr or faster, especially about 10°C/hr or more, or rapidly diluted with water, for example, at a rate of about 0.5 l.$H_2O$/l.solution/hr or faster, especially about 1 l.$H_2O$/l.solution/hr, the aluminum in the solution is hydrolyzed to form colloidal aluminum hydroxide. In the present invention, such rapid cooling or rapid dilution with water can be employed as another method for hydrolyzing an alkaline aluminum-containing solution.

An upper limit on the rapid cooling rate does not theoretically exist, but in practice, rapid cooling of more than 50°C/hr is difficult and very expensive.

Accordingly, a rapid cooling rate of 5° – 50°C/hr is preferable, especially 10° – 30°C/hr.

While the initial temperature of the cooling embodiment may be more than 100°C, the initial temperature of the hydrolysis is less than 100°C as in the case of other hydrolysis reactions, preferably less than 90°C and moreover more than 20°C.

Practically speaking, the range between the initial and final temperature of the cooling embodiment is 100° – 20°C, preferably 90° – 20°C, especially 60° – 30°C.

An upper limit also does not theoretically exist for the dilution embodiment, but in practice, rapid dilution at more than 100 l$H_2O$/l.oslution/hr is difficult.

Accordingly, a rapid dilution of 0.5 – 100 l$H_2O$/l.solution/hr is preferable, especially 1 – 50 l$H_2O$/l.solution/hr. l The initial concentration of the aluminum in such embodiments is preferably from 1 wt% to the 100% supersaturated concentration, especially from 5 wt% to the saturated concentration.

Most preferably, dilution making the initial concentration half is preferred.

Preferably, each of the above hydrolyzing techniques is carried out at a temperature not more than about 100°C, especially not more than about 90°C. This is to avoid unnecessary boiling of the treatment solution. On the other hand, hydrolysis at excessively low temperatures requires long periods of reaction time or causes post-treatment difficulties because of scaling of the precipitated hydrous aluminum oxide onto reactor walls. Accordingly, it is preferred to perform hydrolysis at a temperature of at least about 20°C. The most preferred temperature range is about 30° to about 60°C. The neutralization occurs in a very short period of time independent of the pressure.

The crystalline aluminum oxide present during the hydrolysis in accordance with this invention is $Al_2O_3$ having a crystalline structure with or without $H_2O$ molecule(s). Examples of the crystalline aluminum oxides are crystalline aluminas such as $\alpha$-alumina, $\gamma$-alumina, $\theta$-alumina, k-alumina, x-alumina, and crystalline hydrate aluminas such as boehmite ($Al_2O_3 \cdot \frac{1}{2}H_2O$), and ortho aluminum hydroxides which include bayerite ($Al_2O_3 \cdot 3H_2O$) and gibbsite ($Al_2O_3 \cdot 3H_2O$). Of these, the ortho aluminum hydroxides are especially preferred because they themselves or with hydrous aluminum oxide deposited thereonto by the hydrolysis are somewhat soluble in various acids and alkalis, and therefore their utilization in other industries becomes possible on a commercial basis.

The crystalline aluminum oxide should have an average particle diameter of about 0.5 to about 500 $\mu$. If the average particle diameter is less than about 0.5 $\mu$, the hydrous aluminum oxide formed by the hydrolysis is poor in precipitability. On the other hand, particles with an average particle diameter of above about 500 $\mu$ would have to be used in great quantities because of their small surface areas. Most preferably, the crystalline aluminum oxide has an average particle diameter of 1 to 100 $\mu$.

The amount of the crystalline aluminum oxide to be present in the hydrolysis system is about 1.0 to about 5 Kg per Kg of the aluminum present in the hydrolysis system. The amount of the aluminum is defined as the total amount of aluminum present in one or more liquids that participate(s) in the hydrolysis reaction. If the amount of the crystalline aluminum oxide is less than the lower limit specified above, the effect of its presence is poor, and there is a tendency that the hydrolysis will result in the formation of hydrous aluminum oxide having a high water content and poor precipitability. On the other hand, if the amount exceeds the upper limit, no better effect due to the presence of additional crystalline aluminum oxide is obtained. The especially preferred amount of the crystalline aluminum oxide is 1.5 to 3.5 Kg per kilogram of the aluminum present in the hydrolysis reaction system. When an ortho aluminum hydroxide is used as the crystalline aluminum oxide, the amount is most preferably about 2 to about 3 Kg per kilogram of the aluminum present in the hydrolysis reaction system.

No special procedures are required to make the crystalline aluminum oxide present in the reaction system. For example, in the case where an alkali aluminum-containing solution is treated with an acidic liquid, the crystalline aluminum oxide may be dispersed in the solution, or the acidic liquid, or in the both solution and liquid prior to the hydrolysis. The only requirement is that the crystalline aluminum oxide be present in dispersed form in the aluminum-containing solution during the hydrolysis of the aluminum in the solution. When, however, an alkaline aluminum-containing solution is to be neutralized with an acid, the crystalline aluminum oxide is better dispersed in the aluminum-containing solution prior to neutralization.

As previously stated, the hydrous aluminum oxide formed by the hydrolysis treatment in accordance with this invention is readily precipitatable and has a low water content. This hydrous aluminum oxide is easily flocculated by any ordinary pelletizing treatment in the presence of a flocculating agent, for example, by the method described in Mitsuo Yusa and A. M. Gaudin, American Ceramic Society Bulletin, 43 [5], pages 402–406 (1964), to make larger particles of low water content which become easier to precipitate. Of the pelletizing treatment methods, the method developed by the inventor of the present invention is considered most effective, and it will be described below by reference to FIG. 1.

In the pelletizing apparatus shown in FIG. 1, a mixing drum 3 having a frustoconical bottom 3' is placed within a funnelshaped tank 1 suspended from a beam 2 at the top of the tank 1. Beneath the bottom of the mixing drum 3, a receiver plate 5 is secured to the tank 1 with a gap 5' therebetween by means of a support 20. The mixing drum 3 includes therein a stirrer 6 rotatable about the central axis thereof. The upper end of the rotary shaft of the stirrer is connected to a motor M fixed to the beam 2, and its lower end is supported by a boss 6' of the receiver plate 5. The stirrer 6 has a plurality of vanes 4 and 4' secured thereto, and near the lower end of the rotating shaft centrifugal vanes 7 rotatable within the gap 5' are fixed. As illustrated in the drawing, the directions in which vanes 4 and 4' are secured to the rotating shaft are different from each other by 90°. The gap 5' between the receiver plate 5 and the mixing drum 3 opens into the funnel-shaped tank 1, and a plurality of perpendicular partition plates 8 are provided at this annular opening.

A turbid liquid containing hydrous aluminum oxide is supplied into the mixing drum 3 from a supply pipe 9 provided at the upper portion of the mixing drum 3, and simultaneously, a flocculating liquid for flocculating the hydrous aluminum oxide is fed into the mixing drum 3 from a supply pipe 10. The liquids within the mixing drum are stirred with vigorous collision between upflowing and downflowing liquid portions by the action of the vanes 4 and 4' of the stirrer 6, and the flocculating liquid is incorporated uniformly therein. This stirring serves to flocculate the hydrous aluminum oxide to larger particles of lower water content. The flocculating liquid may be an aqueous solution of any ordinary flocculating agent such as those described in "Separan", Catalog form No. 125, No. 284 and No. 60 of Dow Chemical Co., or "Cyanamid Flocculants" Catalog A-2085 of American Cyanamid Company.

The solution vigorously stirred within the mixing drum flows out from the lower part of the mixing drum, passes through the gap 5', and is discharged into the funnel-shaped tank 1. At the time of discharge, the flow direction is adjusted to be perpendicular by the perpendicular partition walls 8. Accordingly, the discharged solution turns slowly in the direction shown by the arrows in the funnel-shaped tank 1, during which time the hydrous aluminum oxide in the solution gradually becomes large and settles to the bottom of the tank 1. If the average rate of flow of the solution at the time of turning is adjusted to be less than about 1 meter/min, especially about 0.1 to about 0.5 meter/min, larger particles of the hydrous aluminum oxide of low water content are formed rapidly. In FIG. 1, the turning rate is measured by the mean velocity of the solution flowing up from the perpendicular partition plate 8. The above described turning rate can be measured by the naked eye observing the transfer velocity of the granules flowing up in the solution, or it can be calculated by the well-known relative formulae or experimental formulae defined for the structure of various pelletizers and/or the viscosity of the solution.

Since the solution resulting from the neutralization treatment of this invention followed by the removal of hydrous aluminum oxide precipitated is very clear, it can be discharged into rivers. Furthermore, the hydrous aluminum oxide so separated has a very low content of other metals, and can be utilized in many applications.

The work of the inventor of the present invention led to the discovery that when a hydrous aluminum oxide, for example, the hydrous aluminum oxide resulting from the hydrolysis process of this invention, is dissolved in an aqueous solution of an inorganic hydroxide containing aluminum dissolved therein, and the solution is gradually cooled, the aluminum in the solution is precipitated in the form of ortho aluminum hydroxide. If the aluminum compound separated is used as the crystalline aluminum oxide to be present in the hydrolysis reaction system, this invention makes it possible to perform an overall waste liquid treatment in an industry where acidic and alkaline waste liquids containing aluminum dissolved therein are discharged, such as the aluminum etching industry. This overall treatment of waste liquids in accordance with this invention will be described below with reference to one embodiment shown in FIG. 2.

Figure 2:
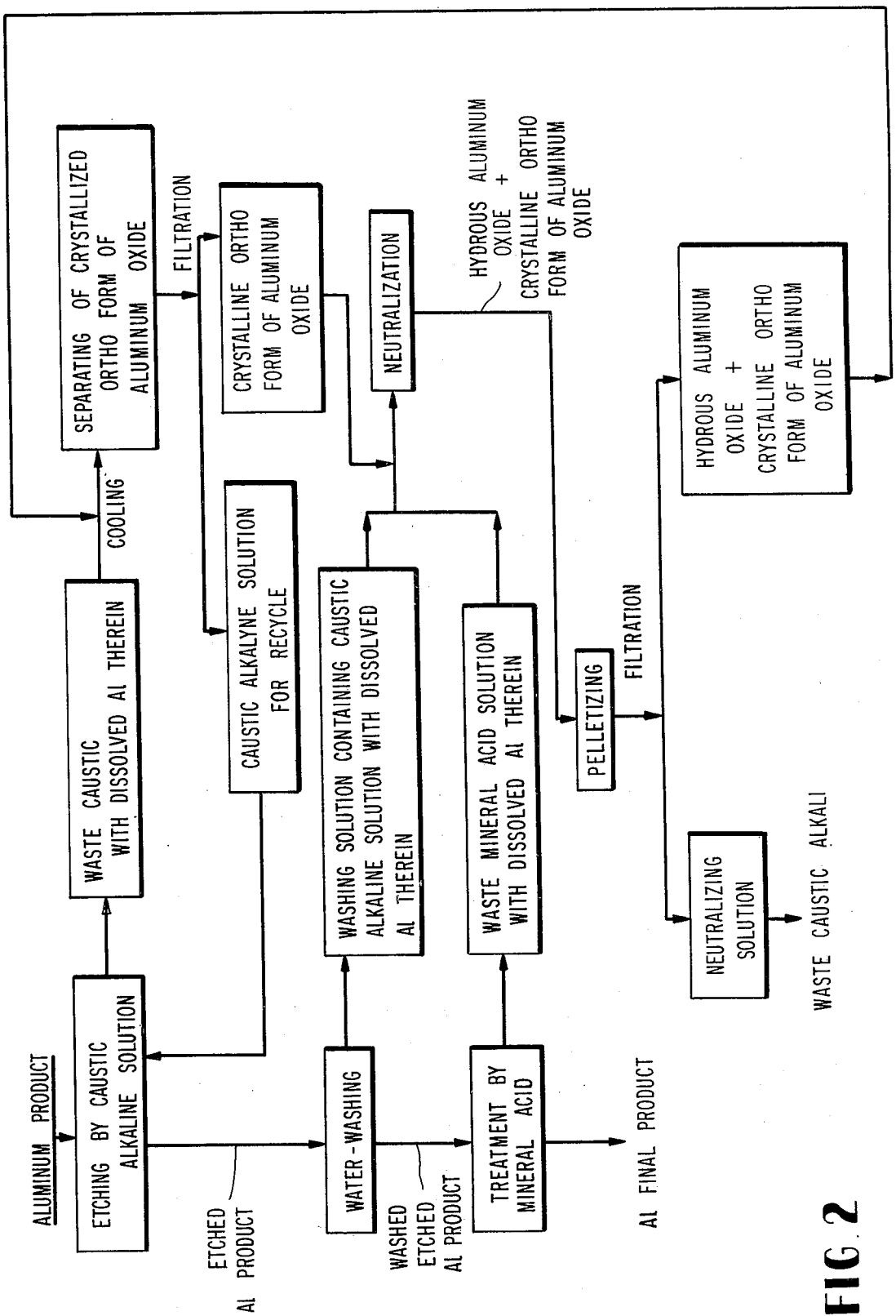
FIG. 2 is a flowsheet showing the practice of the method of this invention as applied to the treatment of an alkali waste liquid and a mineral acid waste liquid resulting from an aluminum etching process.

FIG. 2 shows a basic flowsheet showing the treatment of waste liquids in the aluminum etching process. An aluminum product is subjected to an etching treatment with an aqueous solution of an inorganic hydroxide, such as sodium hydroxide, washed with water, and treated with a mineral acid containing liquid, such as an aqueous solution of sulfuric acid. An inorganic hydroxide waste liquid containing aluminum dissolved therein results from the above etching treatment, a wash liquid containing inorganic hydroxide and dissolved aluminum from the water-washing step and a mineral acid waste liquid containing aluminum dissolved therein from the subsequent mineral acid treatment step, respectively.

To the etching waste liquid containing the inorganic hydroxide and dissolved aluminum is added hydrous aluminum oxide obtained from the neutralization treatment followed by a pelletizing process to be described, and the mixture is gradually cooled. The hydrous aluminum oxide contains crystalline aluminum oxide, but the presence of the crystalline aluminum oxide is not undesired but is rather preferred, as will be described below. By this treatment, the aluminum dissolved in the inorganic hydroxide waste liquid crystallises in the form of ortho aluminum hydroxide. The crystals are separated by filtration, and the liquid is recycled as the etching treatment liquid. The crystalline aluminum oxide is used for the neutralization treatment to be described.

The wash liquid containing dissolved aluminum and inorganic hydroxide and the waste liquid of mineral acid having aluminum dissolved therein are neutralized in the presence of the crystalline aluminum oxide obtained from the inorganic hydroxide liquid by cooling in accordance with this invention. Hydrous aluminum oxide precipitated by the neutralization is subjected to a pelletizing treatment by a method such as described with reference to FIG. 1 to form larger particles. It is then separated by filtration, and used for the treatment of the inorganic hydroxide etching waste liquid as described above. The neutralized waste liquid is very clear after removing the precipitated hydrous aluminum oxide, therefore, it can be discharged to rivers.

In the above cooling process of the inorganic hydroxide waste liquid when the liquid is gradually cooled under the addition of hydrous aluminum oxide the aluminum initially present in the inorganic hydroxide etching waste liquid and the aluminum added in the form of the hydrous aluminum oxide are mostly precipitated in the form of ortho aluminum hydroxide.

In general, the hydrous aluminum oxide to be added to the aqueous inorganic hydroxide solution which contains aluminum and which is subjected to cooling so as to separate out the aluminum is not limited to that obtained from the above neutralization treatment, but may be any amorphous hydrous aluminum oxide expressed by the general formula $Al_2O_3 \cdot nH_2O$. Those in which $n$ is 1 to 6, especially 2 to 4, prove especially effective.

The above gradual cooling under the addition of hydrous aluminum oxide to precipitate crystalline aluminum oxide is performed at a rate of about 0.05 to about 0.5°C/hr. If the cooling rate is faster than about 0.5°C/hr, there is a tendency toward the precipitation of non-crystalline aluminum oxide.

The concentration of the inorganic hydroxide in the above aqueous solution to be cooled should not be too high, or the aluminum dissolved will be precipitated in the form of an aluminate. The concentration of a specific aqueous inorganic hydroxide solution at which an aluminate precipitates varies with the kind of the inorganic hydroxides but it can be determined with simplicity by subjecting a series of aluminum-containing aqueous solutions of an inorganic hydroxide in various concentrations to a precipitating treatment to see whether precipitation of the aluminate occurs or not. For example, with an aqueous solution of sodium hydroxide, this concentration is 30% by weight, and with an aqueous solution of potassium hydroxide, this concentration is 27% by weight.

With increasing amounts of the hydrous aluminum oxide, precipitation of crystalline aluminum oxide begins at a higher temperature, and therefore, the degree of cooling can be reduced. However, if the amount is too large, the ratio of the dissolved aluminum present initially to the aluminum added becomes small, and this is not economical. Most preferably, the amount of the hydrous aluminum oxide to be added is determined so that as a result of addition of the hydrous aluminum oxide the total amount of aluminum (the sum of the amount of aluminum added and the amount of aluminum initially dissolved in the solution) becomes about 10 to about 100%, preferably about 20 to about 50%, in the supersaturated concentration at the temperature at which the hydrous aluminum oxide is added and dissolved.

If a suitable amount of the fine particles of crystalline aluminum oxide, expecially ortho aluminum hydroxide, is copresent during the cooling of the solution under the addition of the hydrous aluminum oxide, the crystallization of aluminum initially dissolved in the solution is promoted. The crystalline aluminum oxide used for the promotion of the crystallization may be those which are the same as those present during the hydrolysis reaction in accordance with this invention. The preferred amount of this crystalline aluminum oxide is about 50 to about 500% of the amount of crystalline aluminum oxide to be precipitated. The crystalline aluminum oxide to promote the crystallization may be added together with the hydrous aluminum oxide, or in the form of a composite composed of the hydrous aluminum oxide and the crystalline aluminum oxide. Examples of such a composite are those precipitated during the neutralization treatment in accordance with the present invention, or their pelletized products, especially those having a particle size of about 1 mm to about 15 mm obtained by an ordinary method or the method illustrated in FIG. 1. The amounts of hydrous aluminum oxide and crystalline aluminum oxide are described above, but if the composite therefrom is used, the amount of the composite used should be controlled considering the amount of each oxides used is in the above range. The co-presence of such a crystalline aluminum oxide has the effect of increasing the upper limit of the cooling rate to about 4°C/hr.

The following Examples and Comparative Example illustrate the present invention.

COMPARATIVE EXAMPLE

To 10 tons of a sodium hydroxide solution containing 178 g/liter of sodium hydroxide and 0.475 g/liter of aluminum in a 30-ton neutralization tank there was added an aqueous solution of sulfuric acid in a concentration of 150 g $H_2SO_4$/liter, while stirring, to neutralize the sodium hydroxide solution to a pH value of 7.0. As a result, colloidal aluminum hydroxide was formed. The colloidal aluminum hydroxide did not settle even when the solution was left to stand for 60 hours after neutralization. A part of the colloid-containing neutralized solution was subjected to the pelletization treatment described below (the same pelletizing treatment was performed in the following Examples), but the colloid particles did not increase in size.

EXAMPLE 1

The same neutralization treatment as in the Comparative Example was performed except that before the addition of the aqueous solution of sulfuric acid, 15 Kg of gibbsite having an average particle diameter of 5.0 $\mu$ was added to the sodium hydroxide solution in the tank, and dispersed uniformly with constant stirring. As a result, the hydrous aluminum oxide precipitated was non-colloidal, and almost completely settled upon standing for 30 minutes after neutralization. When a part of the neutralized solution was subjected to the pelletizing treatment described below, the hydrous aluminum oxide particles increased to 5 – 10 mm in average particle size after being rotated for 1 to 4 minutes, and settled to the bottom of the pelletizer.

Method of Pelletizing Treatment

Using a pelletizer of the type shown in FIG. 1, the following treatment was performed. The total capacity of the funnel-shaped tank 1 was 1000 liters, and the mixing drum 3 had an inside diameter of 0.5 m and a total capacity of 200 liters. The solution to be treated was fed from supply pipe 9 into the mixing drum 3 at a flow rate of 20 liters/min, and simultaneously a 0.1% aqueous solution of polyacrylamide as a flocculating liquid was fed thereinto from supply pipe 10 at a flow rate of 0.1 liter/min. At this time, stirrer 6 equipped with four vanes 4 and 4' and centrifugal vanes 7 was rotated at a speed of 0.2 rpm. The average flow rate of the solution at the time of revolution was about 1 m/min.

EXAMPLE 2

Two tons of bayerite having an average particle diameter of 5 $\mu$ was fed into a 30-ton tank containing 10 tons of a potassium hydroxide solution containing 168 g/liter of potassium hydroxide and 58 g/liter of aluminum dissolved therein, and with constant stirring of the solution in the tank a ½ N aqueous nitric acid solution containing 27 g/liter of aluminum dissolved therein was added to neutralize the solution present in the tank. After neutralization, the pH of the solution was 4.2. The hydrous aluminum oxide precipitated by neutralization was non-colloidal, and could be made into larger particles easily by the pelletizing treatment described above.

EXAMPLE 3

2.4 tons of bayerite having an average particle diameter of 10 $\mu$ was fed into a 30-ton tank containing 10 tons of 1N hydrochloric acid containing 312 g/liter of aluminum chloride dissolved therein, and with a constant stirring of the solution present in the tank the solution was neutralized with a 1N aqueous solution of sodium hydroxide. After neutralization, the pH of the solution was 7.8. When the hydrous aluminum oxide precipitated by neutralization was pelletized as described above, it was converted to large particles having a particle diameter of 3 to 6 mm after 4 minutes rotation.

EXAMPLE 4

One ton of a sodium hydroxide etching waste liquid held at 60°C and containing 150 g/liter of sodium hydroxide and 28 g/liter of aluminum dissolved therein (the saturation concentration of aluminum at 60°C is about 35 g/liter) was placed in a 5-ton iron tank, and 46.5 Kg of hydrous aluminum oxide having the average molecular formula $Al_2O_3 \cdot 2.5H_2O$ was added and dissolved therein (the supersaturation concentration of the aluminum dissolved is 31.5% by weight). The solution was allowed to cool at room temperature. Two hours after the initiation of cooling, 102 Kg of gibbsite having an average particle diameter of 400 $\mu$ was added to the solution being cooled. After being cooled overnight, the solution had a temperature of 20°C (the average cooling rate was about 3.3°C/hr), and large quantities, about 200 Kg, of crystals were separated. When the crystals were filtered, they were found to have an average particle diameter of 500 $\mu$, and X-ray diffraction analysis showed that they were gibbsite. The concentration of the dissolved aluminum in the filtrate was reduced to 11 g/liter. This concentration was almost equal to 10.5 g/liter which is the saturation solubility of aluminum at the above temperature in an aqueous solution of sodium hydroxide at a concentration of 150 g/liter.

The gibbsite separated by filtration was used for the next neutralization treatment, after washing. Ten tons of a sodium hydroxide waste liquid containing 2.1 g/liter of sodium hydroxide and 0.51 g/liter of aluminum dissolved therein was placed in a 30-ton neutralization tank, and 45 Kg of the gibbsite obtained by the above treatment was fed into the tank. With constant stirring, the gibbsite was uniformly dispersed in the waste liquid. The waste liquid was then neutralized by pouring into the tank a sulfuric acid waste liquid containing 150 g/liter of sulfuric acid and 10 g/liter of aluminum dissolved therein. The pH of the solution in the tank after neutralization was 4.2. The precipitated hydrous aluminum oxide in the neutralized solution was pelletized as described above. After about 3 minutes rotation, the hydrous aluminum oxide grew into large particles having a particle diameter of 5 to 13 mm and settled, whereby the solution became clear.

EXAMPLE 5

A 30-ton neutralization tank was charged with 10 tons of a sulfuric acid waste liquid containing 150 g/liter of sulfuric acid, 20 g/liter of oxalic acid and 35 g/liter of aluminum dissolved therein, and with constant stirring of the liquid in the tank it was neutralized by adding 1,000 Kg of gibbsite having an average particle diameter of 10 $\mu$ and 1N aqueous ammonia. After neutralization, the solution has a pH of 7.2. When the turbid neutralized solution was allowed to stand for 30 minutes, the supernatant liquid became clear. The hydrous aluminum oxide precipitated by neutralization grew into large particles having a particle diameter of 3 to 5 mm by the pelletization treatment with 3 minutes rotation.

EXAMPLE 6

1.4 tons of gibbsite having an average particle diameter of 5 $\mu$ was fed into a 30-ton tank containing 10 tons of a sodium hydroxide waste liquid containing 100 g/liter of sodium hydroxide and 45 g/liter of aluminum dissolved therein, and the solution was neutralized with a ½ N oxalic acid aqueous solution containing 0.2 g/liter of aluminum dissolved therein. After neutralization, the solution had a pH of 8.0. One hour after neutralization, the turbid solution became clear. When the hydrous aluminum oxide separated by neutralization was subjected to the pelletizing treatment, it grew into large particles with a particle diameter of 3 to 6 mm after 4 minutes rotation.

EXAMPLE 7

One ton of gibbsite having an average particle size of 5 $\mu$ was fed into a 30-ton tank containing 10 tons of an aqueous solution of aluminum chloride (182 g/liter of dissolved aluminum chloride), and the solution was neutralized with milk of lime containing 100 g/liter of slaked lime. After neutralization, the solution had a pH of 6.1. 30 minutes after neutralization, the turbid solution became clear.

EXAMPLE 8

A 5-ton iron tank was charged with 1 ton of a potassium hydroxide aqueous solution held at 60°C containing 130 g/liter of potassium hydroxide and 25 g/liter of aluminum dissolved therein (the saturation concentration of aluminum at 60°C is about 23 g/liter). 144.5 Kg of an aluminum oxide compound having the average structural formula $Al_2O_3 \cdot 3.4H_2O$ which comprised 70% by weight of gibbsite and 30% by weight of hydrous aluminum oxide ($Al_2O_3 \cdot 3.8H_2O$) was added and dissolved in the potassium hydroxide aqueous solution (the supersaturation concentration of aluminum dissolved is 21.8% by weight). The mixture was allowd to cool at room temperature. After cooling overnight, the temperature of the solution fell to 30°C (average cooling rate: approximately 2.5°C/hr), and a large quantity of gibbsite, approximately 273 Kg, precipitated. Analysis showed that after the precipitation of gibbsite the aluminum concentration of the solution was 7.5 g/liter, which is almost equal to the amount of aluminum dissolved at saturation at 30°C (7.2 g/liter).

While the invention has been described in detail and with reference to specific embodiments thereof, it will be apparent to one skilled in the art that various changes and modifications can be made therein without departing from the spirit and scope thereof.

What is claimed is:

1. In a method for treating an alkaline waste stream containing aluminum dissolved therein by hydrolyzing the aluminum, whereby colloidal hydrous aluminum would be obtained, the improvement comprising conducting said hydrolysis substantially completely by neutralization of the alkaline waste stream with an acid to a pH of substantially 7 in the presence of a crystalline ortho aluminum hydroxide having an average particle diameter of about 0.5 to about 500µ in an amount of about 1 to about 5 kg per kilogram of said aluminum, whereby non-colloidal hydrous aluminum is precipitated on said crystalline ortho aluminum hydroxide, wherein the concentration of aluminum in said waste stream is from 0.01 % to the saturated concentration thereof.

2. The method of claim 1 wherein said crystalline ortho aluminum hydroxide added to said waste stream is one which is precipitated by cooling at a rate of about 0.05 to about 0.5°C/hr an aqueous solution of an inorganic hydroxide containing aluminum dissolved therein, under the addition of a non-crystalline hydrous aluminum oxide in such an amount that as a result of the dissolving of said hydrous aluminum oxide, the aluminum concentration of said aqueous solution becomes about 10 to about 100% excessive of the saturated concentration at the temperature at which said hydrous aluminum oxide is added.

3. The method of claim 1 wherein said crystalline ortho aluminum hydroxide added to said waste stream is one which is precipitated by cooling at a rate of about 0.05 to about 4°C/hr an aqueous solution of an inorganic hydroxide containing aluminum dissolved therein, under the addition of (a) a non-crystalline hydrous aluminum oxide in such an amount that as a result of the dissolving of said non-crystalline hydrous aluminum oxide, the aluminum concentration of said aqueous solution becomes about 10 to about 100% super-saturated concentration at the temperature at which said non-crystalline hydrous aluminum oxide is added, and (b) about 50 to 500% by weight, based on ortho aluminum hydroxide to be separated from said inorganic hydroxide aqueous solution by cooling, of crystalline aluminum oxide having an average particle diameter of about 0.5 to 500.

4. The method of claim 3 wherein as said non-crystalline hydrous aluminum oxide and said crystalline aluminum oxide to be added to said inorganic hydroxide aqueous solution, there is used a composite product formed of non-crystalline hydrous aluminum oxide and crystalline aluminum oxide, said composite being obtained as a precipitate when a solution containing aluminum dissolved therein is hydrolyzed in the presence of about 1 to about 5 Kg, per kilogram of the aluminum present in said solution, of a crystalline aluminum oxide having an average particle diameter of about 0.5 to about 500.

5. The method of claim 4 wherein said composite product is pelletized to an average particle size of about 1 to about 15 mm by revolution in the presence of a flocculating agent prior to adding it into said inorganic hydroxide aqueous solution.

6. The method of claim 5 wherein said waste stream is a waste aqueous solution of an inorganic hydroxide having aluminum dissolved therein, and said acid is an aqueous solution of at least one member selected from the group consisting of sulfuric acid, hydrochloric acid, nitric acid, phosphoric acid and oxalic acid.

7. The method of claim 6 wherein said waste stream is a waste aqueous solution of sodium hydroxide containing aluminum dissolved therein.

8. The method of claim 7 wherein said crystalline ortho aluminum hydroxide has an average particle diameter of about 1 to about 100µ, and its amount present in the waste stream is about 2 to about 3 Kg per kilogram of the aluminum present in the waste stream.

9. The method of claim 1 wherein said waste stream containing aluminum dissolved therein is a waste aqueous solution of a water-soluble aluminum compound.

10. The method of claim 1 wherein said waste stream containing aluminum dissolved therein is one which is obtained by dissolving aluminum is an alkaline liquid.

11. The method of claim 10 wherein said alkaline liquid is an aqueous solution of an inorganic hydroxide.

12. The method of claim 11 wherein said inorganic hydroxide is sodium hydroxide.

13. The method of claim 1 wherein said waste stream containing aluminum dissolved therein is one which is obtained by dissolving an aluminum compound in an alkaline liquid.

14. The method of claim 13 wherein said alkaline liquid is an aqueous solution of an inorganic hydroxide.

15. The method of claim 14 wherein said inorganic hydroxide is sodium hydroxide.

* * * * *